US009720099B1

(12) United States Patent
Ekambaram et al.

(10) Patent No.: US 9,720,099 B1
(45) Date of Patent: Aug. 1, 2017

(54) USER TRAJECTORY DETERMINATION

(71) Applicant: International Business Machines Corporation, Armonk, NY (US)

(72) Inventors: Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/055,050

(22) Filed: Feb. 26, 2016

(51) Int. Cl.
*G01S 19/34* (2010.01)
*G01S 19/42* (2010.01)

(52) U.S. Cl.
CPC ................... *G01S 19/42* (2013.01)

(58) Field of Classification Search
CPC ....................................... G01S 19/34
See application file for complete search history.

(56) References Cited

U.S. PATENT DOCUMENTS

| 8,626,184 | B2 | 1/2014 | Dicke |
| 2007/0146129 | A1 | 6/2007 | Sun |
| 2008/0234935 | A1 | 9/2008 | Wolf et al. |
| 2011/0054780 | A1* | 3/2011 | Dhanani ............ G01C 21/26 701/465 |
| 2013/0085861 | A1 | 4/2013 | Dunlap |
| 2013/0166200 | A1 | 6/2013 | Dhanani et al. |
| 2014/0128021 | A1 | 5/2014 | Walker et al. |
| 2014/0365505 | A1* | 12/2014 | Clark ................ G06F 17/30864 707/748 |

OTHER PUBLICATIONS

Owings, "DeLorme Earthmate PN-60w review", Nov. 2, 2010, 30 pages, <http://gpstracklog.com/2010/11/delorme-earthmate-pn-60w-review.html>.
Paek et al., "Energy-Efficient Rate-Adaptive GPS-based Positioning for Smartphones", MobiSys '10, Jun. 15-18, 2010, 16 pages.
Parmar, "KP Bird: Android NotificationListenerService Example", Jul. 31, 2013, 9 pages, <http://kpbird.blogspot.com/2013/07/android-notificationlistenerservice.html>.
"Power and Battery—High Performance iOS Apps", downloaded on Dec. 14, 2015, 18 pages, <https://www.safaribooksonline.com/library/view/high-performance-ios/9781491910993/ch04.html>.
Upton, "Your GPS Will Disable Itself If It's Going Too Fast", Aug. 20, 2011, 2 pages, <http://brokensecrets.com/2011/08/20/your-gps-will-disable-itself-if-its-going-too-fast>.
Zhuang et al., "Improving Energy Efficiency of Location Sensing on Smartphones", MobiSys'10, Jun. 15-18, 2010, 15 pages.

* cited by examiner

*Primary Examiner* — Genna Mott
(74) *Attorney, Agent, or Firm* — Maeve Carpenter

(57) ABSTRACT

A method, executed by a computer, includes receiving a notification to a user of a mobile device, extracting travel information for the user from the notification, determining an expected travel interval from the travel information, and activating global positioning system tracking of the user during the expected travel interval to provide a user trajectory for the travel interval. A computer system and a computer program product corresponding to the method area also disclosed herein.

18 Claims, 5 Drawing Sheets

USER TRAJECTORY DETERMINATION

BACKGROUND OF THE INVENTION

The present invention relates generally to the field of positional tracking and more particularly to positional tracking of mobile device users.

Many mobile devices provide the capability for tracking a location a user of a mobile device. However, tracking a user's location often drains the battery of a mobile device.

SUMMARY

As disclosed herein, a method, executed by a computer, includes receiving a notification to a user of a mobile device, extracting travel information for the user from the notification, determining an expected travel interval from the travel information, and activating global positioning system tracking of the user during the expected travel interval to provide a user trajectory for the travel interval. A computer system and a computer program product corresponding to the method area also disclosed herein.

DETAILED DESCRIPTION

Embodiments of the present invention recognize that data collection of a user's location or a user's trajectory over time are valuable to various enterprises. Embodiments of the present invention recognize that continuous use of a mobile device's GPS unit often consumes unacceptable quantities of power.

Embodiments of the present invention recognize that the existing alternatives to determine a user's trajectory have limitations. Incomplete or limited data for a user's trajectory may be collected when using a cell tower triangulation. Incomplete trajectory or user movement data may be collected when attempting to use Wi-Fi triangulation methods as a user moves outside (limited to indoor movement for user trajectories). Extra power consumption by motion sensors such as an accelerometer may occur when using a user's movement to activate GPS tracking. Furthermore, the unnecessary activation of the GPS unit to collect low value data may occur when a user travels to a bathroom or a co-worker's office when using motion sensors to activate the GPS tracking.

Embodiments of the present invention determine a travel interval of a user for activation of GPS tracking in a user's mobile device based on an analysis of notifications received by the user's mobile device. Furthermore, embodiments of the present invention provide intermittent or periodic activation of GPS tracking of a user of a mobile device during expected travel intervals. Additionally, embodiments of the present invention provide periodic de-activation of GPS tracking during non-travel intervals when a user may not be making significant changes in location and, thereby conserve mobile device power.

Figure 1:
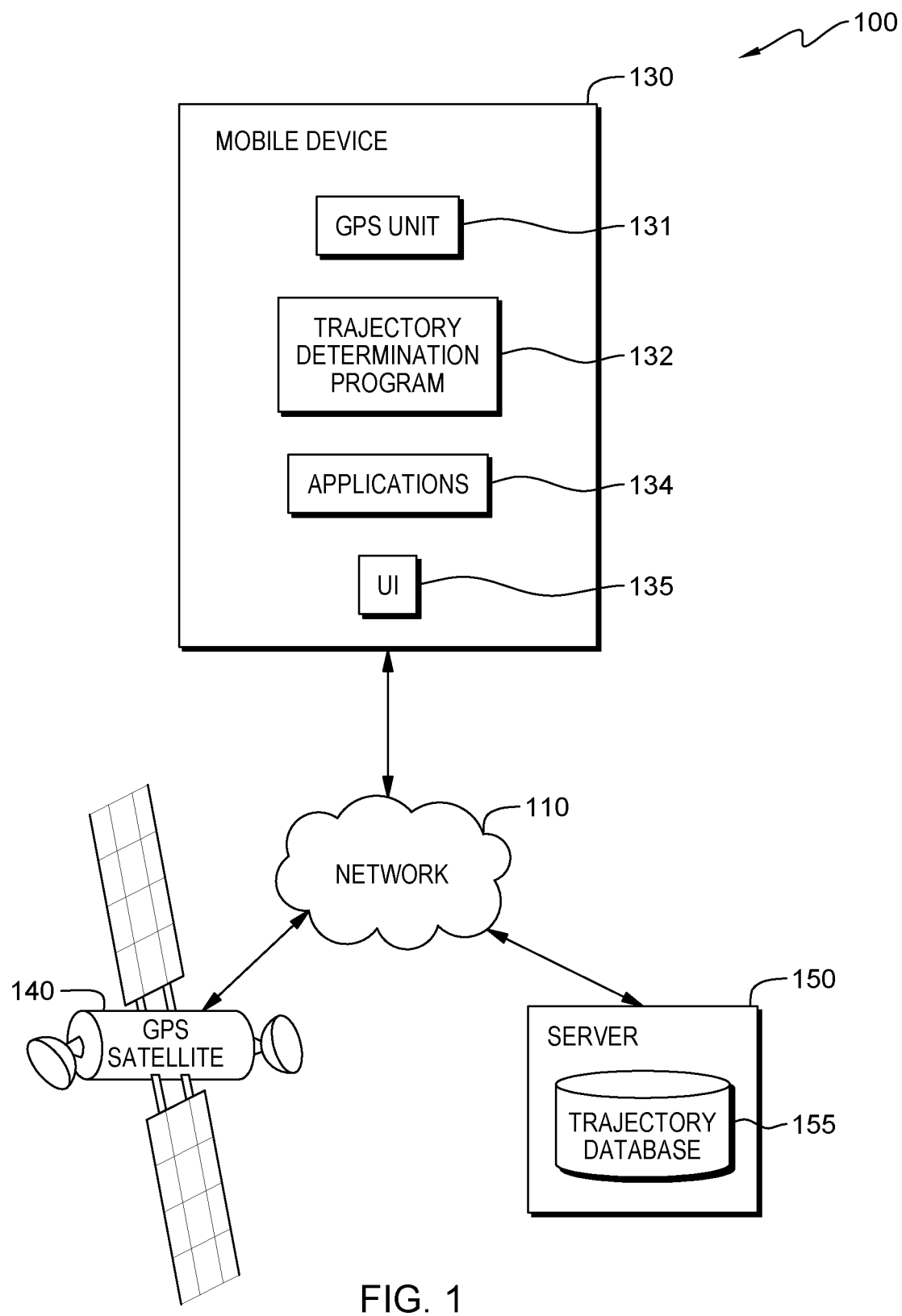
FIG. 1 is a functional block diagram illustrating a distributed data processing environment, in accordance with at least one embodiment of the present invention.

FIG. 1 is a functional block diagram illustrating a distributed data processing environment, generally designated 100, in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted, distributed data processing environment 100 includes mobile device 130, GPS satellite 140, and server 150 all interconnected over network 110. Network 110 can include, for example, a telecommunications network, a local area network (LAN), a virtual LAN (VLAN), a wide area network (WAN), such as the Internet, or a combination of the these, and can include wired or wireless connections. Network 110 can include one or more wired and/or wireless networks that are capable of receiving and transmitting data including receiving GPS signals or radio waves, voice, and/or video signals, including multimedia signals that include voice, data, and video information. In general, network 110 can be any combination of connections and protocols that will support communications between mobile device 130, GPS satellite 140, server 150, and other computing devices (not shown) within distributed data processing environment 100.

Mobile device 130 is a mobile computing device. Examples of mobile device 130 include a smart phone, a wearable computer such as a smart watch, smart glasses or goggles, a hand held device such as a tablet, an personal digital assistant (PDA), an e-reader, a laptop computer, a notebook computer, or other movable computing device capable of being connected to GPS satellite 140 and server 150 via network 110. Mobile device 130 may send and receive data from server 150 and other computing devices (not shown) in distributed data processing environment 100. As depicted, mobile device 130 includes GPS unit 131 trajectory determination program 132, user interface (UI) 135, and applications 134. Mobile device 130 using GPS unit 131 can determine a user's location and when continually activated (i.e., ON) can provide a complete and detailed record of a user's movements or a user trajectory. However, continuous location determination by GPS unit 131 may require significant power consumption and consequently reduce battery life in mobile device 130.

GPS unit 131 is a location determination device. GPS unit 131 may include a GPS receiver, a tracker that may include a tracker algorithm, and algorithms used for solving a set of navigation equations to determine a location of mobile device 130 based on signals received from GPS satellite 140. Identifying GPS signals, receiving GPS signals, and calculating a location by GPS unit 131 consumes power in mobile device 130. While depicted in mobile device 130, in some embodiments, GPS unit 131 is a handheld or wearable location determination device that sends location tracking data to server 150 or another computing device (not shown in FIG. 1).

Trajectory determination program 132 analyzes the text and data in notifications received by mobile device 130 from applications 134 and other sources to determine a power efficient method to provide a user's trajectory by intermittently activating and de-activating (turning ON and OFF) GPS tracking. A user trajectory such as a user's path or route for a travel interval from one location to another location may be valuable to various enterprise entities such as data mining companies or advertisers. While depicted in FIG. 1 as a single program on mobile device 130, the code and routines of trajectory determination program 132 may be included in one or more programs or applications that may reside in more than one computing device in distributed data processing environment 100.

Applications 134 include one or more known software applications or system utilities including those found in a mobile device operating system (OS). Applications 134 include but are not limited to software applications referred to as apps hereafter such as messaging apps (e.g., Whatsapp®), social media applications (e.g., Twitter® or LinkIn®), scheduling applications, navigation apps (e.g., Google Maps®), and any other mobile device applications or system utilities capable of providing notifications to mobile device 130.

UI 135 on mobile device 130 is a user interface providing an interface between a user and mobile device 130, and enables a user of mobile device 130 to interact with programs and data on mobile device 130, server 150, and other computing devices (not shown in FIG. 1). UI 135 may be a graphical user interface (GUI), an active area or line for text inputs, a web user interface (WUI), or other type of user interface and can display text, documents, user options, application interfaces, and instructions for operation such as queries, and include the information that a program presents to a user. In an embodiment, UI 135 receives a user input via a touch screen, a keyboard, a mouse, a display, an audio or voice, visual or motion sensing device or other peripheral device standard in computer devices.

Server 150 can be a web server, a management server, a standalone computing device, a desktop computer, a notebook, a tablet, a mobile computing device, or any other electronic device or computing system capable of receiving, sending, and processing data. Server 150 can be a web server, a server system, a laptop computer, or any programmable electronic device capable of communicating with mobile device 130, and other electronic devices in distributed data processing environment 100 via network 110. In various embodiments, server 150 is a shared pool of configurable computing resources (e.g., networks, servers, storage, applications, and services) that act as a single pool of seamless resources when accessed such as used in a cloud-computing environment. Server 150 includes trajectory database 155. Server 150 can send and receive data such as user trajectory data from mobile device 130. Server 150 may store received user trajectory data in trajectory database 155. While depicted on server 150, trajectory database 155 may reside in one or more other computers (not shown in FIG. 1). Server 150 may include other programs used in analyzing trajectory data retrieved from trajectory database 155.

Figure 2:
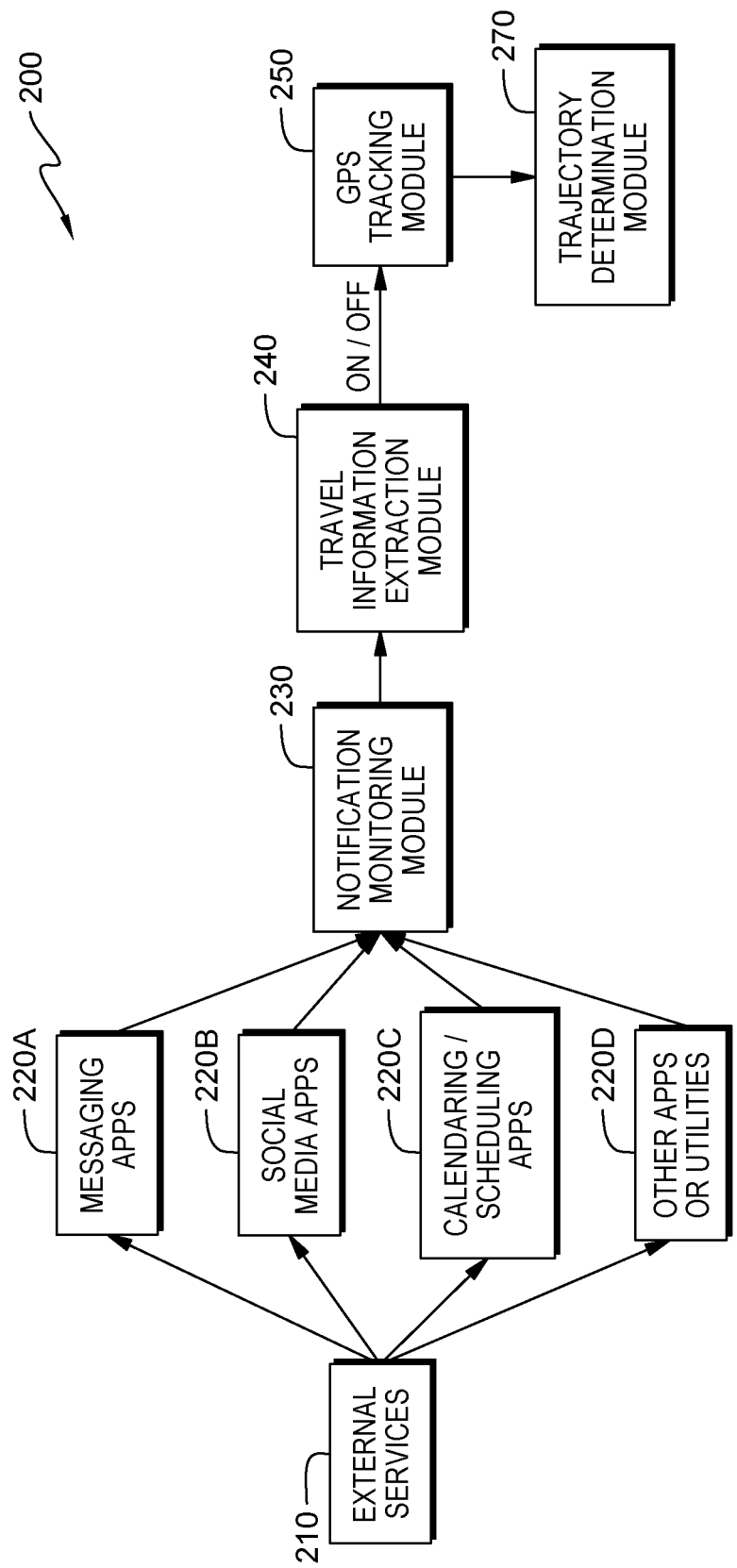
FIG. 2 is a block diagram depicting one example of a system diagram in a user trajectory determination system in accordance with at least one embodiment of the present invention.

FIG. 2 is a block diagram depicting one example of a trajectory determination system 200 in accordance with at least one embodiment of the present invention. As depicted, system 200 includes external services 210, applications or utilities 220A-D, notification monitoring module 230, travel information extraction module 240, GPS tracking module 250, and trajectory determination module 270. System 200 depicts an example of computing elements or system components (e.g., software components) that may be utilized in the determination of a user's trajectory power efficiently. The modules of system 200 may reside on mobile device 130 and/or server 150.

External services 210 may be any service that may provide data, text, and information to mobile device 130 using one or more of applications 220A-D. External services 210 may include a cellular service provider, a travel booking service provider such as Expedia® or Ola.com® online taxi booking service, a social media network service provider such as Facebook®, a banking service provider, a calendar or schedule service provider such as eCalendar®, an e-mail service provider, or any other external service provider to mobile device 130. External services 210 may provide messages or notifications to mobile device 130 that may include information related to user's location, a user's anticipated movements, or a user's travel information. For example, an external provider such as a cellular service provider may provide messages indicating the use of a new cell tower by mobile device 130 where the use of a new cell tower that trajectory information extraction module 240 may use to confirm or modify a user's current location and/or a user's travel information. Similarly, in another example, external services 210 may be a banking service provider that sends an alert or message to mobile device 130 indicating the use of an identification card at a specific automated teller (ATM) for a check deposit.

Applications or utilities 220A-D include software applications or apps and system utilities used in mobile device 130 that may send or receive notifications. As depicted, or applications or utilities 220A-D include messaging apps 220A such as Whatsapp® or iMessage®, social media apps 220B such as Twitter®, Calendaring/scheduling apps 220C such as eCalendar®, and other apps or utilities 220D that send notifications to mobile device 130. Other apps or utilities 220D may include a portion of a mobile device operating system (OS) that can generate notifications for mobile device 130. For example, a portion of a mobile device OS may generate messages or updates to available Wi-Fi hot spots as a user moves to a new location. In various embodiments, notifications of new Wi-Fi hot spots are used by travel information extraction module 240 as a determination to activate or leave GPS unit 131 ON for GPS tracking module 250. In some embodiments, a notification of a new Wi-Fi hot spot modifies the travel information or travel interval extracted by travel extraction module 240. A modification of travel information and/or travel interval from a notification from any one of applications or utilities 220A-D as captured by notification monitoring module 230 can be used by trajectory determination module 270 to verify or modify a user's trajectory.

Travel information extraction module 240 receives notifications from notification monitoring module 230. Travel information extraction module 240 analyses the text and received data in notifications to extract information relating to a user's travel. Travel information extraction module 240 may extract travel information for an expected travel interval. For example, the extracted travel information may include one or more of a meeting day, a meeting location, a meeting time, a meeting duration or meeting interval, and other similar information that may in part determine a travel interval. A travel interval or travel information may be extracted, for example, from a proposed meeting in a received e-mail or a message from one of messaging apps 220A, a social media post in social media apps 220B, a calendar entry, or a calendar update from calendaring/ scheduling apps 220C, and/or extracted from a notification received from other apps or utilities 220D.

Travel information extraction module 240 may analyze travel information such as a meeting location, a meeting duration, a meeting day, and a meeting time for a travel interval that may be useful in determining when to activate and/or de-activate GPS tracking module 250. Travel information extraction module 240, for example, may send data to GPS tracking module to de-activate (i.e., turn OFF) GPS tracking module 250 for a time interval preceding meeting.

In various embodiments, travel information extraction module 240 receives and analyzes notifications from notification monitoring module 230 including notifications of a new cell tower use from a cellular service provider or an identification of a new Wi-Fi hot spot from an OS for mobile device 130. Travel information extraction module 240 may use new cell tower usage or identification of new Wi-Fi hot spots to indicate a user location change for verification or modification of travel information such as an expected user travel interval.

GPS tracking module 250 receives a command from travel information extraction module 240 for activation and de-activation of GPS unit 131 for GPS tracking. By selectively turning ON (activating) and OFF (de-activating) GPS unit 131 based on the command received from travel information extraction module 240, GPS tracking module 250 provides a power efficient approach to determining a user's trajectory. In some embodiments, GPS tracking module 250 tracks a user trajectory during expected travel intervals using GPS unit 131. In various embodiments, GPS tracking module 250 sends GPS tracking data to trajectory determination module 270. In certain embodiments, GPS tracking module 250 sends GPS tracking data for a user trajectory to server 150 or other computing device (not shown in FIG. 1).

Figure 5:
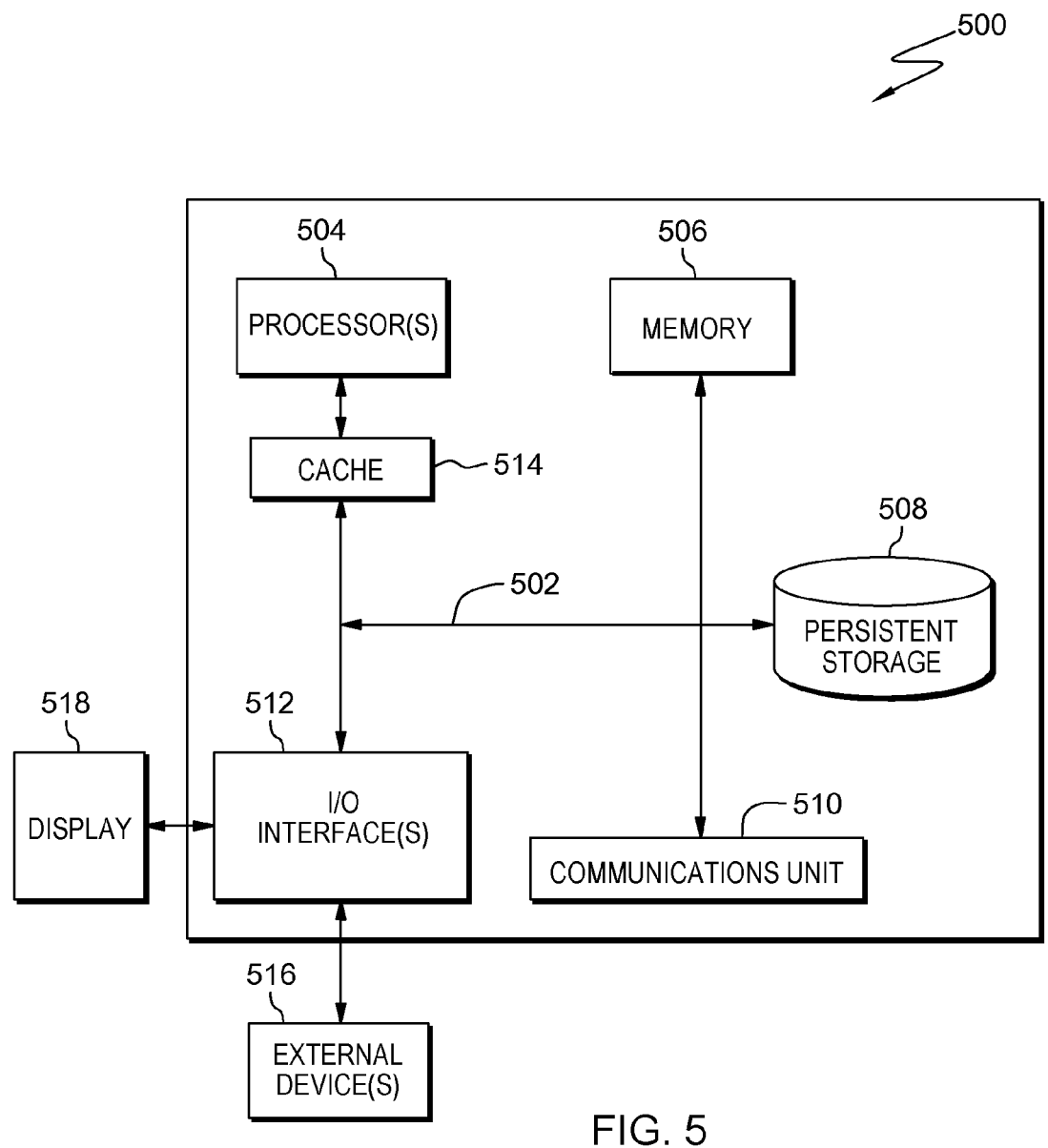
FIG. 5 is a block diagram depicting components of a computer system in accordance with at least one embodiment of the present invention.

Trajectory determination module 270 receives from GPS tracking module 250 GPS data used in determining a user's trajectory based, at least in part, on travel information from notifications used by travel information module 240 to determine when to activate and de-activate (i.e., turn ON and OFF) GPS unit 131. Based on received GPS data, trajectory determination module 270 may provide a user trajectory as GPS data such as GPS coordinates, street addresses, a route, changes in latitudes and longitudes, businesses, landmarks, and the like. In addition, a user trajectory may include a start time, a stop time, a travel speed, a travel mode, a starting location or a start point, one or more intermediate locations, an ending location, and any other information collectable from a user's trajectory as determined by a user trajectory determination. Trajectory determination module 270 may determine a user's trajectory for one or more of the following: for a travel interval, for one or more distances, for a mode of travel (e.g., by foot, by car, or by airplane), by a destination (e.g., a mall, a gym, a business), for a route, for a period of time such as an hour, a day, or a month, or other method. In some embodiments, trajectory determination module 270 provides a user's trajectory in more than one format. For example, a user's trajectory for the user's walk to work may be provided as one of a set of one or more GPS coordinates, a list of street addresses, or list of businesses and street addresses passed. Trajectory determination module 270 may send one or more user's trajectories to persistent storage 508 (as depicted in FIG. 5), to server 150, or to one or more other computing devices (not depicted in FIG. 1).

Figure 3:
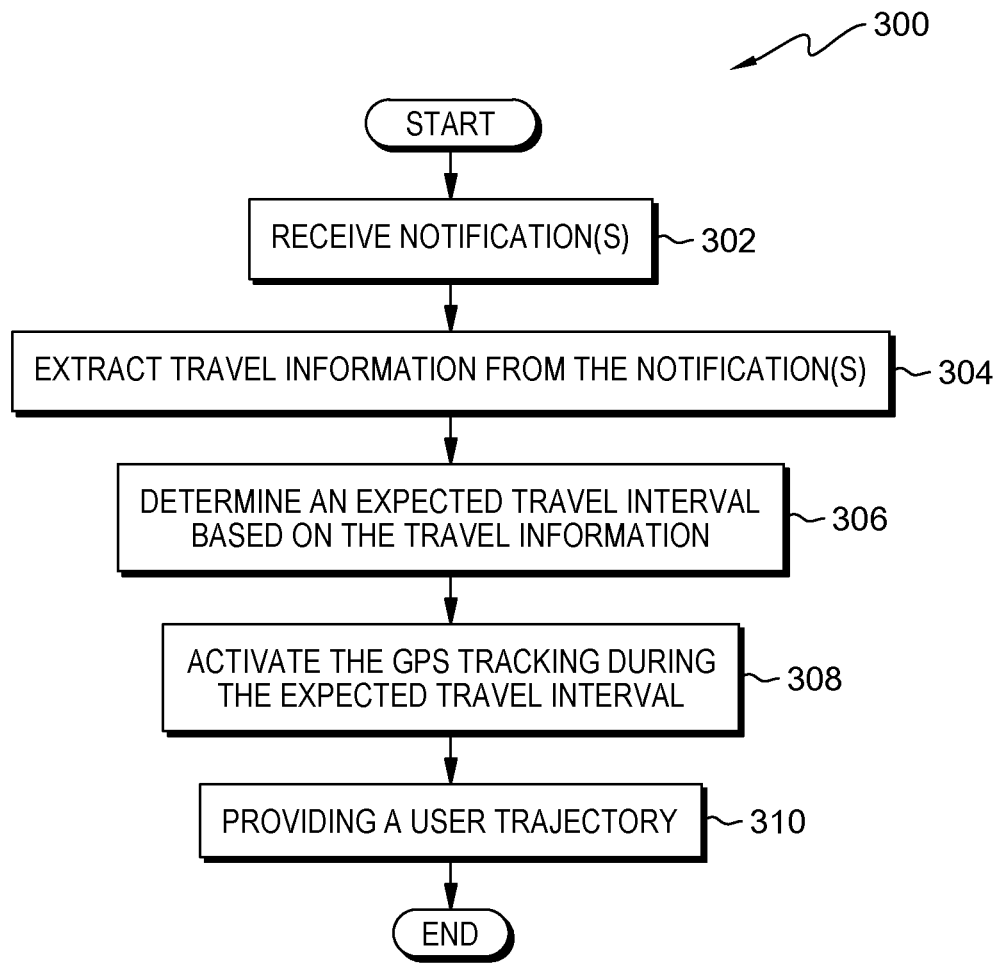
FIG. 3 is a flowchart depicting one example of a user trajectory determination method in accordance with at least one embodiment of the present invention.

FIG. 3 is a flowchart depicting one example of user trajectory determination method 300 in accordance with at least one embodiment of the present invention. As depicted, user trajectory determination method 300 includes receiving (302) a notification for a user, extracting (304) travel information, determining (306) an expected travel interval, activating (308) GPS tracking of the user, and providing (310) a user trajectory for the travel interval. User trajectory determination method 300 enables power efficient determination of a user's trajectory. User trajectory determination method 300 may be conducted by mobile device 130 and/or server 150.

Receiving (302) a notification for a user may include receiving a notification for a user of mobile device 130. The notification may be an extended notification, a message, an alert, a post, an e-mail, or any other notification received by mobile device 130. Notifications may be sent from external services (e.g., external services 210 in FIG. 2) using applications 220A-D. For example, a user of mobile device 130 may receive a message from another user's smart phone to set up lunch at Jack's Deli, a specific deli for noon.

Extracting (304) travel information from a notification may include extracting a location, a time, a departure location, a destination, a mode of travel, a duration of travel, a duration of a meeting or activity, and other similar travel related information. For example, extracting travel information may include extracting from a notification received from mobile device 130's OS the identification of a new Wi-Fi hot spot indicating a user's change in location. User trajectory determination method 300 may conduct analytics on a notification to determine travel information. For example, user trajectory determination method 300 may extract travel information using one or more of text analytics, key word analysis, semantic analysis, natural language processing (NLP), and cognitive computing methods. Extracting travel information from a notification includes extracting travel information either sequentially, or concurrently from one or more notifications received by mobile device 130.

Determining (306) an expected travel interval may include analyzing the travel information extracted in the previous step (304) to identify one or more of a travel start time, a current location, a destination, a starting location, a travel mode, a route, a projected travel interval, a destination arrival time, an activity, an activity duration, a meeting duration, and other similar travel information used to determine a travel interval. For example, based on a current location and a location for the meeting an extracted departure time for the meeting may be estimated. The expected travel interval may correspond to the expected departure time, an expected travel mode, and the meeting start time.

In one particular example, travel information includes extracting from a social media post received by mobile device 130 that a soccer team is going to the hotel after the 2 pm game. Analyzing the post (step 306), user trajectory determination method 300 may determine an expected travel interval for travel from the soccer field to the hotel. Based on a standard time of one and a half hours for the soccer game or a previously received notification with the game scheduled time, an approximate start time of 4:30 pm may be determined for the expected travel interval for a drive to the hotel. Additionally, assuming that a previous e-mail, social media post, or message received by mobile device 130 includes the soccer field name or address and the hotel name or hotel address, user trajectory method 300 can determine an expected travel interval from the soccer field to the hotel. The expected travel interval may be determined using known mapping applications based on the extracted starting location and the extracted destination.

Activating (308) GPS tracking of the user during the expected travel interval may include sending a command to GPS unit 131 to activate GPS tracking of the user prior to or at the projected start of the expected travel interval and to continue the GPS tracking until the end of the expected travel interval. Based on the determination of a travel interval from the travel information extracted from notifications received and analyzed, user trajectory determination method 300 includes sending a command to GPS unit 131 to begin GPS tracking by the start of the expected travel interval. In various embodiments, a lead-time is included in the command to start GPS tracking before the start of the expected travel interval. For example, the command may be configured such that the GPS tracking starts a selected duration (e.g., ten minutes) the expected travel interval is to begin. In an embodiment, the command to activate GPS tracking includes periodically or intermittently activating GPS during an expected travel interval where the frequency of periodically activating GPS occurs more frequently or at a higher frequency near a travel endpoint. In other embodiments, an extension of GPS tracking is included in the command to de-activate GPS tracking at the end of the expected travel interval. For example, the command to GPS unit 131 to de-activate GPS tracking may be sent a period of time such as a few minutes after the expected travel interval completion.

Providing (310) a user trajectory may include providing a user trajectory for one or more travel intervals. In various embodiments, a user trajectory determination method 300 is used to provide a user trajectory one or more travel intervals occurring over a period of time. For example, a user trajectory may be provided for an hour, a day, a week, or a month. In other embodiments, a user trajectory determination method 300 provides a user trajectory based on one or more of a travel mode, a destination, an activity, a geography, a day of the week, or a time. For example, a user trajectory determination method 300 may provide a user trajectory based on a destination such as a shopping mall, a specific store, or a shopping district. A user trajectory determination method 300 may provide individual user trajectories for a travel interval, group user trajectories by a specific characteristic such as by a user's trajectories generated on a Friday night, or group a user's trajectories for a period of time such as providing a user's trajectories for a week. User trajectory determination method 300 may provide a user's trajectory to another program or application for analysis, to a database, to storage such as persistent storage 508 in mobile device 130, to server 150, or to one or more other computing devices (not depicted in FIG. 1).

Figure 4:
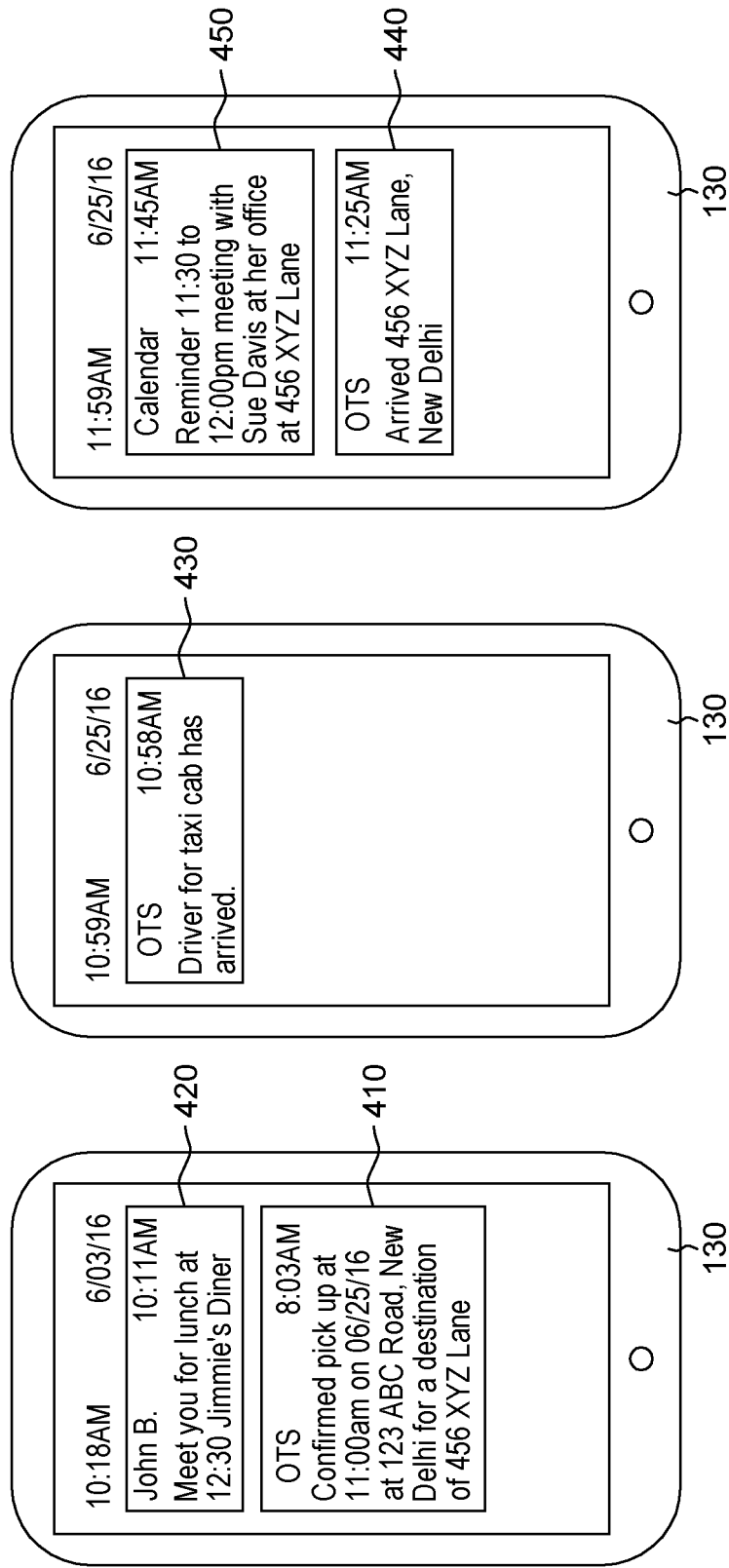
FIG. 4A-4C are front view illustrations depicting various examples of notifications received by a mobile device in accordance with at least one embodiment of the present invention.

FIGS. 4A-C are front view illustrations depicting various examples of notifications received by mobile device 130 in accordance with at least one embodiment of the present invention. As depicted FIGS. 4A-C include notifications 410, 420, 430, 440, and 450 received by mobile device 130 at various times on Jun. 3, 2016. The notifications 410, 420, 430, 440, and 450 include travel information for a destination and an intermediate destination or location. The notifications received relate to travel information for the user of mobile device 130 that may be used by a user trajectory determination method such as a user trajectory determination method 300 depicted in FIG. 3 to determine expected travel intervals for GPS tracking.

As depicted in FIG. 4A, mobile device 130 receives notification 410 and notification 420 that may be used by a user trajectory determination method to extract travel information for the user of mobile device 130. Notification 410 received from an on-line taxi service (OTS) at 8:03 am confirms a pick up time of 11:00 am at 123 ABC Road, New Delhi for a ride to 456 XYZ Lane, New Delhi. A user trajectory determination method using a system such as system 200 may extract from notification 410 travel information that may be used in an expected travel interval.

For example, a user trajectory determination method may extract an expected travel start time of 11:00 am, a location of 123 ABC Road, New Delhi, and a travel mode such as by taxi or by car. A user trajectory determination method may extract from notification 410 a destination (456 XYZ Lane, New Delhi) and may use known methods such as a mapping algorithm or app determine a travel time for the expected travel interval indicated in the received notification or notification 410. A user trajectory determination method may use the travel information extracted from notification 410 to determine an expected travel interval start time and the determined travel duration. The expected travel start time and the determined travel duration may be used to determine an expected travel interval. With a user trajectory determination method, based on the expected travel start time, signal or command may be sent GPS unit 131 to begin GPS tracking. Based on the expected travel interval, GPS unit 131 may be turned ON by 11:00 am and continue GPS tracking for at least the determined travel time.

Additionally, a user trajectory determination method may verify the extracted travel information when GPS tracking is activated at or before 11:00 am by confirming that the user of mobile device 130 is at 123 ABC Road, New Delhi at 11:00 am by the received GPS data from GPS unit 131. Similarly, a user trajectory determination method may verify the extracted travel information such as the expected travel interval by verifying with the received GPS data that the user of mobile device 130 arrives at the destination (i.e., 456 XYZ Lane, New Delhi) around the arrival time predicted using the determined travel time. A user determination may also modify the extracted travel information based on a current GPS location. For example, the user is running late and the user has not left 123 ABC Road at 11:10 am as recorded by activated GPS tracking, in response to not seeing a change in the user's current GPS location, user trajectory determination method 300 modifies the expected travel interval (e.g., not leaving at 11:00 am).

Notification 420 received by mobile device 130 from John B. at 10:11 am is a notification that provides a plan to meet for lunch. A user trajectory determination method may extract from notification 420 travel information such as a destination (i.e., Jimmie's Diner) and a time (i.e., 12:30 pm). A user trajectory determination method may use the destination as a travel interval end time. Additionally, the destination (i.e., Jimmie's Diner) may be used to confirm the expected travel interval upon verifying the GPS tracking data for the user's mobile device 130 location as Jimmie's Diner at or around 12:30 pm. In various embodiments, a range of start time and a range of arrival time are included for the expected travel interval in a user trajectory determination method. For example, for an expected arrival time from notification 420 may an expected arrival time between 12:15 am and 12:45 pm.

In some embodiments, a user trajectory determination method includes the ability to predict a period of time for an event such as a lunch based on an analysis of previous user trajectory data or analysis of previously scheduled similar events. For example, in the case of notification 420 discussed above, based on an analysis of the travel information extracted, and using an analysis of the user's previously scheduled lunches with John B. and/or previously scheduled lunches at Jimmie's Diner, a user trajectory determination method may predict an expected time duration for lunch at Jimmie's Diner. Based on the predicted time duration for lunch, a user trajectory determination method may send a signal to GPS unit 131 to de-activate or turn off GPS tracking for the expected time duration of lunch at Jimmie's Diner. Turning off GPS tracking during lunch at Jimmie's Diner or for other events or activities with a predicted time or known duration when the user may not experience a signification change of location (e.g., the time for a scheduled meeting or attending a game of known duration) reduces power consumption by mobile device 130 while continuing to provide GPS tracking data for a user's trajectory for changes in the user's location.

As depicted FIG. 4B includes notification 430, which is a notification such as a text from OTS, an online taxi service, received by mobile device 130 at 10:58 am informing the user of the arrival of a taxi. A user trajectory determination method may extract from notification 430 travel information such as a confirmation of an expected travel interval start location (i.e., 123 ABC Road, New Delhi) and an expected travel interval start time for the expected travel interval. Based on notification 430, a user trajectory determination method may send a signal such as a command to GPS unit 131 to start GPS tracking of the user of mobile device 130. In other embodiments, a user trajectory determination method sends a signal to turn on GPS unit 131 for GPS tracking upon the receipt of a notification of the use of a new cellular tower by mobile device 130 or a notification of a new Wi-Fi hot spot indicating a user's change in location.

As depicted, FIG. 4C includes notification 440 and notification 450 that may be used by a user trajectory determination method to extract travel information on a user of mobile device 130. For example, notification 440 depicts a notification from OTS that the taxi has arrived at 456 XYZ Lane at 11:25 am. A user trajectory determination method may extract from notification 440 a destination and an arrival time verifying an expected travel interval end time. With the extracted arrival time from notification 440 that indicates the end of an expected travel interval for the taxi trip, a user trajectory determination method may send a signal to GPS unit 131 to stop GPS tracking.

Notification 450 depicts a calendar reminder received at 11:15 am for an upcoming meeting from 11:30 am to 12:00 pm with Sue Davis at 456 XYZ Lane. A user trajectory determination method may use the meeting start time and the location of the meeting extracted from notification 450 as an expected travel interval end time and a destination for the expected travel interval for the user of mobile device 130 to get to the meeting. In response to determining a travel interval end, a user trajectory determination method may send a signal such as a command to GPS unit 131 to turn off GPS tracking of the user of mobile device 130 during the scheduled meet time. By turning off GPS tracking during a meeting or other similar event such as a game, an appointment, a show, a dinner, or an airline travel segment (the user while changing location has few significant new real world experiences inside the airplane), a user trajectory determination method conserves mobile device 130's power. Additionally, the user trajectory determination method provides a power efficient method of selectively activating GPS tracking for the collection of location data for the changing location of a user of mobile device 130.

FIG. 5 depicts a block diagram 500 of components of a computer system, which is an example of a system such as mobile device 130 and server 150 within distributed data processing environment 100, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Server 150 includes processor(s) 504, cache 514, memory 506, persistent storage 508, communications unit 510, input/output (I/O) interface(s) 512, and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is part of persistent storage 508.

Communications unit 510, in these examples, provides for communications with other data processing systems or devices, including resources of mobile device 130, GPS satellite 140, server 150, and other computing devices not shown in FIG. 1. In these examples, communications unit 510 includes one or more network interface cards. Communications unit 510 may provide communications with either or both physical and wireless communications links. Program instructions and data used to practice embodiments of the present invention may be downloaded to persistent storage 508 through communications unit 510.

I/O interface(s) 512 allows for input and output of data with other devices that may be connected to server 150. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor. Display 518 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method, executed by one or more processors, the method comprising:
   receiving, by the one or more processors, a notification to a user of a mobile device;
   extracting, by the one or more processors, travel information for the user of the mobile device from the notification;
   determining, by the one or more processors, an expected travel interval from the travel information;
   determining, by the one or more processors, a user device location is at a start location at a time prior to or at an expected start time associated with the expected travel interval from the travel information;
   modifying, by the one or more processors, the expected travel interval based, at least in part, on determining the user device location is not at the start location at a time prior to or at the expected start time associated with the expected travel interval from the travel information;
   activating, by the one or more processors, a global positioning system tracking of the user device during the expected travel interval to provide a user trajectory for the user of the mobile device during the expected travel interval, wherein activating the global positioning system tracking includes periodically activating a global positioning unit on the mobile device; and
   de-activating, by the one or more processors, the global positioning system tracking during one or more non-travel intervals.

2. The method of claim 1, wherein the notification is at least one or more of a message, an alert, a post, and an e-mail.

3. The method of claim 1, wherein the notification corresponds to one or more of a message, a social media application, and a wireless network event.

4. The method of claim 1, wherein the travel information comprises one or more of a start time, a stop time, a duration, a location, a destination, a start point, a route, and an activity.

5. The method of claim 1, wherein extracting travel information comprises conducting analytics on the notification.

6. The method of claim 1, wherein extracting, by the one or more processors, travel information further comprises receiving a second notification to the user of the mobile device.

7. The method of claim 6, wherein extracting, by the one or more processors, travel information further comprises, extracting additional travel information from the second notification.

8. The method of claim 1, wherein determining an expected travel interval further comprises determining, by the one or more processors, one or more of a current location, a required travel distance or time, and an expected travel mode.

9. The method of claim 1, wherein the user trajectory comprises one or more of a route, a start time, a stop time, a duration, a travel speed, a starting location, one or more intermediate locations, a mode of travel, and an ending location.

10. The method of claim 1, wherein extracting travel information for the user from the notification further comprises extracting, by the one or more processors, location information from the notification to the user of the mobile device.

11. The method of claim 1, wherein extracting, by the one or more processors, travel information for the user from the notification further comprises modifying the travel information based on a current location.

12. The method of claim 1, wherein activating the global positioning system tracking comprises activating a global positioning system (GPS) unit on the mobile device more frequently near a travel endpoint.

13. The method of claim 1, further comprising, providing, by the one or more processors, the user's trajectory to another entity or service.

14. A computer program product comprising:
   one or more computer readable storage media and program instructions stored on the one or more computer readable storage media, the program instructions executable by a processor, the program instructions comprising instructions for:
   receiving a notification to a user of a mobile device;
   extracting travel information for the user from the notification;
   determining an expected travel interval from the travel information;
   determining a user device location is at a start location at a time prior to or at an expected start time associated with the expected travel interval from the travel information;
   modifying the expected travel interval based, at least in part, on determining the user device location is not at the start location at a time prior to or at the expected start time associated with the expected travel interval from the travel information;
   activating a global positioning system tracking of the user device during the expected travel interval to provide a user trajectory for the user of the mobile device during the expected travel interval, wherein activating the global positioning system tracking includes periodically activating a global positioning unit on the mobile device; and
   de-activating the global positioning system tracking during one or more non-travel intervals.

15. The computer program product of claim 14, wherein the travel information comprises one or more of a start time, a stop time, a duration, a location, a destination, a start point, a route, and an activity.

16. The computer program product of claim 14, wherein extracting travel information comprises conducting analytics on the notification.

17. The computer program product of claim 14, wherein the program instructions for extracting travel information further comprise instructions for receiving a second notification to the user of the mobile device.

18. A computer system comprising:

one or more computer processors;

one or more computer readable storage media;

program instructions stored on the one or more computer readable storage media for execution by at least one of the one or more computer processors, the program instructions comprising instructions to perform:

receiving a notification to a user of a mobile device;

extracting travel information for the user from the notification;

determining an expected travel interval from the travel information;

determining a user device location is at a start location at a time prior to or at an expected start time associated with the expected travel interval from the travel information;

modifying the expected travel interval based, at least in part, on determining the user device location is not at one of the start location at a time prior to or at the expected start time associated with the expected travel interval from the travel information;

activating the global positioning system tracking of the user device during the expected travel interval to provide a user trajectory for the user of the mobile device during the expected travel interval, wherein activating the global positioning system tracking includes periodically activating a global positioning unit on the mobile device; and de-activating a global positioning system tracking during one or more non-travel intervals.

\* \* \* \* \*